United States Patent Office 3,557,105
Patented Jan. 19, 1971

3,557,105
2,7-DI-(HETEROCYCLIC AMINO)-4-AMINO-6-PHENYL-PTERIDINES
Josef Roch, Biberach an der Riss, Germany, assignor to Boehringer Ingelheim G.m.b.H., Ingelheim am Rhein, Germany, a corporation of Germany
No Drawing. Filed Oct. 11, 1967, Ser. No. 674,641
Claims priority, application Germany, Oct. 14, 1966,
T 32,276
Int. Cl. C07d 57/28
U.S. Cl. 260—247.5                                              11 Claims

ABSTRACT OF THE DISCLOSURE

Compounds of the formula

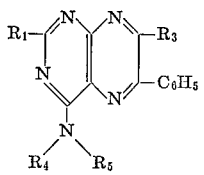

wherein
$R_1$ is pyrrolidino or 2'-methyl-morpholino,
$R_3$ is pyrrolidino, piperidino, 3'-hydroxy-piperidino or 2'-methyl-morpholino,
$R_4$ is β-hydroxy-ethyl, β-hydroxy-n-propyl or β,γ-dihydroxy-n-propyl, and
$R_5$ is β-hydroxy-n-propyl or methyl, with the proviso that $R_1$ and $R_3$ are not simultaneously 2'-methyl-morpholino,
useful as coronary dilators in warm-blooded animals.

THE PRIOR ART

U.S. Pat. 2,940,972 discloses 2,4,6,7-tetra-substituted pteridines, where one of the substitutents is a nitrogen-containing heterocyclic ring, two of the other substituents are substituted or unsubstituted amino or a nitrogen-containing heterocyclic ring, and the fourth substituent is substituted or unsubstituted amino, a nitrogen-containing heterocyclic ring, hydrogen, halogen, alkyl, aralkyl, aryl, substituted or unsubstituted hydroxyl, or substituted or unsubstituted mercapto. These compounds are discloesd to exhibit coronary-dilating, antipyretic, analgesic and sedative activities.

This invention relates to novel 2,4,6,7-tetra-substituted pteridines as well as to various methods of preparing these compounds.

More particularly, the present invention relates to tetra-substituted pteridines of the formula

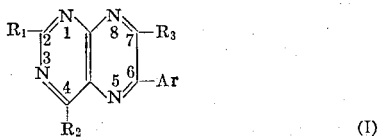

wherein
Ar is phenyl, halo-phenyl, nitro-phenyl, hydroxy-phenyl, lower alkyl-phenyl or lower alkoxy-phenyl,
$R_1$ and $R_3$ are each pyrrolidino, hydroxy-pyrrolidino, lower alkyl-pyrrolidino, piperidino, hydroxy-piperidino, lower alkyl-piperidino, piperazino, hydroxy-piperazino, lower alkyl-piperazino, morpholino or lower alkyl-morpholino, with the proviso that $R_1$ and $R_3$ are not simultaneously morpholino or lower alkyl-morpholino, and
$R_2$ is di-lower alkyl-amino, alkyl-cycloalkyl-amino or alkyl-aralkyl-amino, each having one or more hydroxyl substituents attached to the hydrocarbon moiety.

The compounds according to the present invention may be prepared by a number of different methods involving well known chemical principles, among which the following have proved to be particularly convenient and efficient:

Method A

By reacting a compound of the formula

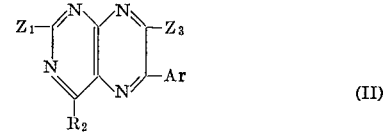

wherein Ar and $R_2$ have the same meanings as in Formula I and $Z_1$ and $Z_3$, which may be identical to or different from each other, are halogen, substituted hydroxyl or substituted mercapto, although one of them may already have a meaning ascribed to $R_1$ and $R_3$ in Formula I, with amines of the formulas $R_1H$ and $R_3H$ wherein $R_1$ and $R_3$, which may be identical to or different from each other, have the same meanings as in Formula I.

Method B

By reacting a compound of the formula

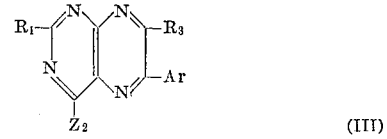

wherein Ar, $R_1$ and $R_3$ have the same meanings as in Formula I and $Z_2$ is halogen, substituted hydroxyl or substituted mercapto, with an amine of the formula $R_2H$ wherein $R_2$ has the same meanings as in Formula I.

The reactions of methods A and B are carried out at a temperature between room temperature and 220° C., if desired in the presence of an acid-binding agent and of an inert solvent. The selection of the proper reaction temperature depends mainly upon the nature of substituents $Z_1$, $Z_2$ and $Z_3$ as well as upon the reactivity of the amines $R_1H$, $R_2H$ and $R_3H$. If $Z_1$, $Z_2$ or $Z_3$ are halogen, only moderately elevated reaction temperatures are required to replace them by $R_1$, $R_2$ or $R_3$, respectively. On the other hand, if $Z_1$, $Z_2$ or $Z_3$ are substituted hydroxyl or substituted mercapto, the replacement reaction requires higher reaction temperatures; in some instances it is advantageous to add a reaction accelerator, preferably a copper salt or a salt formed by the amine reaction component with an acid, or to perform the reaction in a closed vessel.

In those cases where $Z_1$, $Z_2$ and $Z_3$ are substituted hydroxyl or substituted mercapto, the substituents may be lower alkyl, aralkyl or aryl.

The solvent medium for the reaction may be any desired inert organic solvent, such as acetone, benzene, dioxane or dimethylformamide.

The acid-binding agent may be an inorganic or tertiary organic base, such as an alkali metal hydroxide, an alkali metal carbonate or a trialkylamine; or also one or more of the amine reaction components $R_1H$, $R_2H$ and $R_3H$, provided they are present in sufficient excess over and above the amount stoichiometrically required to react with the pteridine compound II or III. If present in sufficient quantity, the amine reaction components may also serve as the solvent medium for the reaction.

If method A is used to replace $Z_1$ and $Z_3$ with $R_1$ and $R_3$ which are identical to each other, the reaction mixture must contain at least two mols of the amine reactant per mol of pteridine compound II. On the other hand, if method A is used to replace $Z_1$ and $Z_3$ with $R_1$ and $R_3$ which are different from each other, the reaction may be performed stepwise as follows: If $Z_1$ and $Z_3$ are identical, for instance if both are halogen, $Z_1$ is replaced first by $R_1$, and then in a second reaction step $Z_3$ is replaced by $R_3$; on the other hand, if $Z_1$ and $Z_3$ are not identical, for instance if one is halogen and the other is substituted hydroxyl or substituted mercapto, the halogen is replaced first, as a rule.

The pteridine compounds II and III used as starting materials in methods A and B may themselves be prepared by the process described in U.S. Pat 2,940,972. Thus, a compound of the Formula II may, for instance, be obtained by reacting an analogous 6-aryl-2,4,7-trichloro-pteridine with a hydroxyalkyl-amine; and a compound of the Formula III may, for instance, be obtained by reacting a 2,7 - dichloro-4-alkylmercapto-6-aryl-pteridine with compounds of the formula $R_1H$ and $R_3H$, as defined above. In this manner the following previously unknown starting compounds were prepared:

4-(N - ethanol - isopropanolamino) - 7 - chloro-2-(2'-methyl-morpholino)-6-phenyl-pteridine, M.P. 105–110° C.;

7 - ethoxy-4-diisopropanolamino - 2 - morpholino-6-phenyl-pteridine, M.P. 203–205° C.;

7-benzyloxy - 4 - diisopropanolamino-2-morpholino-6-phenyl-pteridine, M.P. 226–227° C.;

4-diisopropanolamino - 2 - morpholino-7-phenoxy-6-phenyl-pteridine, M.P. 148–150° C.; and 7-ethylthio-4-diisopropanolamino - 2 - morpholino-6-phenyl-pteridine, M.P. 202–203° C.

The following examples further illustrate the instant invention and will enable others skilled in the art to understand it more completely. It should be understood, however, that the present invention is not limited solely to the particular examples given below.

EXAMPLE 1

Preparation of 4-(N-ethanol-isopropanolamino)-2,7-dipyrrolidino-6-phenyl-pteridine by method A (a) 7.8 gm. (0.02 mol) of 4-(N-ethanol-isopropanolamino)-2,7-dichloro-6-phenyl-pteridine, M.P. 196–198° C. (prepared by reacting 2,7-dichloro-4-iodo-6-phenyl-pteridine or 2,4,7-trichloro-6-phenyl-pteridine with N-ethanol-isopropanolamine in dioxane while cooling), were admixed with 25 cc. of pyrrolidine, and the mixture was refluxed for one hour. Thereafter, while it was still hot, the dark-colored reaction solution was poured into about 500 cc. of water at room temperature, whereby a yellow precipitate was formed. The aqueous mixture was allowed to stand for a while, was then vacuum-filtered, and the filter cake was washed with water and then dried. 8.8 gm. (95% of theory) of raw reaction product were obtained. For purification, the raw product was re-precipitated from 0.1 N hydrochloric acid with 2 N ammonia and then recrystallized once from methanol and once from a mixture of equal parts by volume of ethylene chloride and cyclohexane. The purified product had a melting point of 198–200° C. and was identified to be 4-(N-ethanol-isopropanolamino)-2,7-dipyrrolidino-6-phenyl-pteridine of the formula

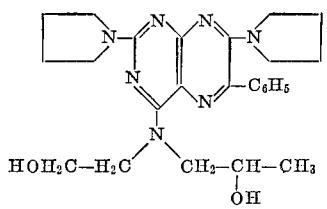

(b) The same compound was obtained in analogous fashion by starting from 8.5 gm. (0.02 mol) of 4-(N-ethanol-isopropanolamino) - 7 - chloro-2-pyrrolidino-6-phenyl-pteridine, M.P. 188–190° C. (obtained by allowing 2,7-dichloro-4-iodo-6-phenyl-pteridine to stand with pyrrolidine in dioxane at about 30° C. for approximately one hour).

EXAMPLE 2

Preparation of 4-diisopropanolamino-2-morpholino-7-pyrrolidino-6-phenyl-pteridine by method A 9.2 gm. (0.02 mol) of 7-chloro-4-diisopropanolamino-2-morpholino-6-phenyl-pteridine, M.P. 191–195° C. (obtained from 2,7-dichloro-4-iodo-6-phenyl-pteridine and morpholine in a manner analogous to that described in Example 1b), were admixed with 20 cc. of pyrrolidine, and the mixture was refluxed for one hour. Thereafter, the reaction solution was worked up as described in Example 1a, yielding 9.1 gm. (92% of theory) of the raw reaction product, which was recrystallized twice from a mixture of methanol and dioxane (5:1 by volume). The purified product had a melting point of 216–218° C. and was identified to be 4-diisopropanolamino-2-morpholino-7-pyrrolidino-6-phenyl-pteridine of the formula

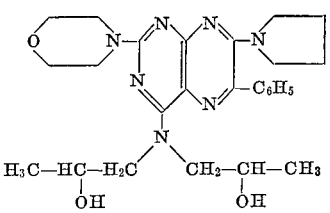

EXAMPLE 3

Using a procedure analogous to that described in Example 1, 4-diisopropanolamino - 2,7 - di-(N'-methyl-piperazino)-6-phenyl-pteridine, M.P. 130–132° C., of the formula

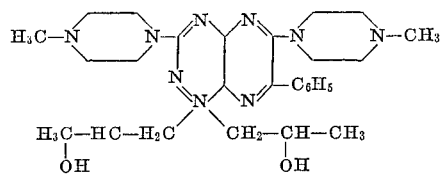

was prepared from 2,7-dichloro-4-diisopropanolamino-6-phenyl-pteridine, M.P. 186–187° C., and N-methyl-piperazine. The yield was 97% of theory.

EXAMPLE 4

Preparation of 4-diisopropanolamino-2,7-dipyrrolidino-6-phenyl-pteridine by method A 4.2 gm. (0.01 mol) of 7-chloro-4-diisopropanolamino-2-methylthio-6-phenyl-pteridine, M.P. 199–201° C. (obtained by reacting 4,7-dichloro-2-methylthio-6-phenyl-pteridine with diisopropanolamine in dioxane while cooling), were admixed with 20 cc. of pyrrolidine and a small amount of copper sulfate, and the mixture was heated for two hours at about 200° C. in a closed tube. Thereafter, the dark-colored reaction solution was poured into 400 cc. of water at room temperature, whereby an orange precipitate was formed. The precipitate was immediately collected and re-precipitated once from 0.1 N hydrochloric acid with 2 N ammonia, yielding 3.0 gm. (63% of theory) of the raw reaction product, which was recrystallized twice from methanol. The purified product had a melting point of 220–223° C. and was identified to be 4-diisopropanolamino - 2,7 - dipyrrolidino-6-phenyl-pteridine of the formula

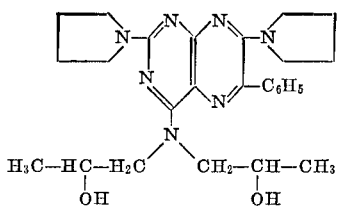

EXAMPLE 5

Preparation of 4-(N-ethanol-isopropanolamino)-2,7-dipyrrolidino-6-phenyl-pteridine by method B 2.0 gm. (0.005 mol) of 4-ethylthio-2,7-dipyrrolidino-6-phenyl-pteridine, M.P. 203–207° C. (obtained by briefly refluxing 4-ethylthio-2,7-dichloro-6-phenyl-pteridine with pyrrolidine) were admixed with 20 cc. of N-ethanol-isopropanolamine and a small amount of N-ethanol-isopropanolamine hydrochloride, and the mixture was refluxed for about eight hours. Thereafter, the excess unreacted amine was distilled off in vacuo, and the residue was taken up in about 200 cc. of water, whereby a precipitate was formed. The precipitate was collected, re-precipitated once from 0.1 N hydrochloric acid with 2 N ammonia, and recrystallized once from methanol and once from a mixture of equal volumes of ethylene chloride and cyclohexane, yielding 0.9 gm. (39% of theory) of a compound which was identical to the end product of Example 1a.

EXAMPLE 6

Using a procedure analogous to that described in Example 5, 4 - (N-ethanol-isopropanolamino)-2,7-dipyrrolidino-6-phenyl-pteridine was also prepared from 2,7-dipyrrolidino-4-phenylthio-6 - phenyl - pteridine, M.P. 225–227° C., and N-ethanol-isopropanolamine. The yield was about 45% of theory.

EXAMPLE 7

Using a procedure analogous to that described in Example 5, 4 - (N-ethanol-isopropanolamino)-2,7-dipyrrolidino-6-phenyl-pteridine was also prepared from 4-benzylthio-2,7-dipyrrolidino-6-phenyl-pteridine and N - ethanol-isopropanolamine. The yield was about 45% of theory.

EXAMPLE 8

Preparation of 4-(N-ethanol-isopropanolamino)-2,7-dipyrrolidino-6-phenyl-pteridine by method A 5.1 gm. (0.01 mol) of 4-(N-ethanol-isopropanolamino)-2,7-phenoxy-6-phenyl-pteridine [obtained by heating 4-(N-ethanol-isopropanolamino)-2,7 - dichloro - 6 - phenyl-pteridine with sodium phenolate in phenol] were admixed with 50 cc. of pyrrolidine and 1 gm. of pyrrolidine hydrochloride, and the mixture was for about 12 hours at 120° C. in a closed pressure tube. Thereafter, the reaction solution was evaporated to about one-half its volume and was then poured into about 300 cc. of water at room temperature, whereby an amorphous yellow precipitate formed after a short time of standing. The precipitate was collected by vacuum filtration, washed with water and dried. The yield of raw product was 80% of theory. For purification purposes the raw product was reprecipitated once from 0.1 N hydrochloric acid with 2 N ammonia, and was then recrystallized twice from methanol and once from a mixture of equal parts by volume of ethylene chloride and cyclohexane. The purified product had a melting point of 196–199° C. and was identified to be 4-(N-ethanol-isopropanolamino)-2,7 - dipyrrolidine - 6 - phenyl-pteridine.

EXAMPLE 9

Preparation of 4-diisopropanolamino-2,7-di(3'-hydroxy-piperidino)-6-phenyl-pteridine by method A 4.8 gm. (0.01 mol) of 4-diisopropanolamino-2-methylthio-7-phenoxy-6-phenyl-pteridine, M.P. 192–193° C. (obtained by heating 7-chloro-4-diisopropanolamino-2-methylthio-6-phenyl-pteridine with sodium phenolate in phenol), were admixed with 30 gm. of 3-hydroxy-piperidine and a small amount of 3-hydroxy-piperidine hydrochloride, and the mixture was heated for about 12 hours at 120–130° C. Thereafter, the excess unreacted 3-hydroxy-piperidine was distilled off in vacuo, and the residue was taken up in about 400 cc. of water, whereby 3.5 gm. (65% of theory) of an amorphous yellow precipitate formed. The precipitate was collected, reprecipitated once from 0.1 N hydrochloric acid with 2 N ammonia, and then recrystallized twice from a mixture of equal volumes of methanol and water. The purified product had a melting point of 212–218° C. and was identified to be 4-diisopropanolamino-2,7-di(3'-hydroxy-piperidino)-6 - phenyl-pteridine of the formula

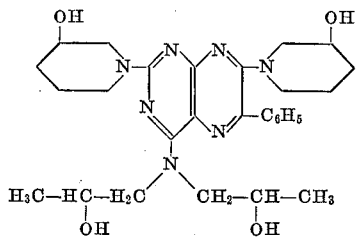

EXAMPLE 10

Using a procedure analogous to that described in Example 9, 4-diisopropanolamino-2,7-di(3'-hydroxy-piperidino)-6-phenyl-pteridine was prepared from 5.2 gm. (0.01 mol) of 4-diisopropanolamino-2,7-diphenoxy - 6 - phenyl-pteridine, M.P. 70–100° C. (obtained by heating 2,7-dichloro-4-diisopropanolamino-6-phenyl-pteridine with sodium phenolate in phenol), and 3-hydroxy-piperidine. The yield was 76% of theory.

EXAMPLE 11

Preparation of 4-diisopropanolamino-7-(3'-hydroxy-piperidino)-2-morpholino-6-phenyl-pteridine by method A 5.3 gm. (0.01 mol) of 4-diisopropanolamino-2-morpholino-7-phenylthio-6-phenyl-pteridine, M.P. 202–203° C. (obtained by heating 7-chloro-4-diisopropanolamino-2-morpholino-6-phenyl-pteridine with sodium thiophenolate in thiophenol and dioxane), were admixed with 15 gm. of 3-hydroxy-piperidine and a small amount of copper sulfate, and the mixture was refluxed for about three hours. Thereafter, the reaction mixture was taken up in about 400 cc. of water, whereby 3.0 gm. (about 60% of theory) of a yellow precipitate formed. The precipitate was collected, reprecipitated once from 0.1 N hydrochloric acid with 2 N ammonia, and recrystallized once from a mixture of methanol and water (2:1 by volume) and once from benzene. The purified product had a melting point of 189–192° C. and was identified to be 4-diisopropanolamino - 7-(3'-hydroxy-piperidino)-2-morpholino-6-phenyl-pteridine of the formula

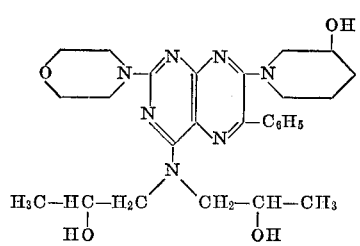

EXAMPLE 12

Using a procedure analogous to that described in Example 11, 4 - diisopropanolamino-7-(3'-hydroxy-piperidino)-2-morpholino-6-phenyl-pteridine was also prepared from 5.5 gm. (0.01 mol) of 7-benzylthio-4-diisopropanolamino - 2 - morpholino - 6 - phenyl-pteridine, M.P. 198–199° C. (obtained by heating 7-chloro-4-diisopropanolamino-2-morpholino-6-phenyl-pteridine with sodium benzylmercaptide in benzylmercaptan and dioxane). The yield of raw product was also about 60% of theory.

EXAMPLE 13

Using a procedure analogous to that described in Example 1, 4-(N-ethanol-isopropanolamino)-7-(3'-hydroxypiperidino)-2-pyrrolidino-6 - phenyl-pteridine, M.P. 131–134° C., of the formula

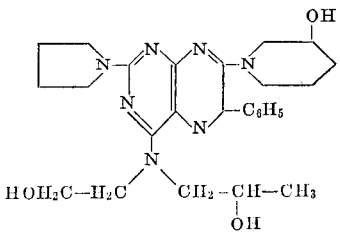

was prepared from 4 - (N - ethanol-isopropylamino)-7-chloro - 2 - pyrrolidino - 6 - phenyl-pteridine, M.P. 188–190° C., and 3-hydroxy-piperidine.

EXAMPLE 14

Using a procedure analogous to that described in Example 1, 4-(N-ethanol-isopropanolamino)-7-(2'-methyl-morpholino)-2-pyrrolidino-6-phenyl-pteridine, M.P. 125–130° C., of the formula

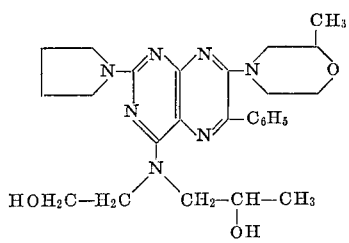

was prepared from 4-(N-ethanol-isopropanolamino)-7-chloro-2-pyrrolidino - 6 - phenyl-pteridine and 2-methyl-morpholine.

EXAMPLE 15

Using a procedure analogous to that described in Example 1, 4 - (N-ethanol-isopropanolamino) - 2 - (2'-methyl-morpholino)-7-pyrrolidino - 6 - phenyl-pteridine, M.P. 110–125° C., was prepared from 4-(N-ethanol-isopropanolamino) - 7 - chloro-2-(2'-methyl-morpholino)-6-phenyl-pteridine, M.P. 105–110° C., and pyrrolidine.

EXAMPLE 16

Using a procedure analogous to that described in Example 1, 4 - (N - ethanol-isopropanolamino)-2-(2'-methyl - morpholino) - 7 - piperidino-6-phenyl-pteridine, M.P. 107–130° C., of the formula

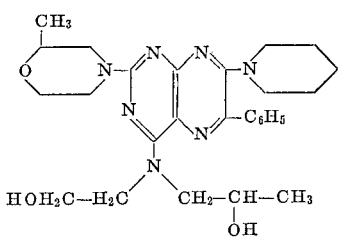

was prepared from 4-(N-ethanol-isopropanolamino-7-chloro-2-(2'-methyl-morpholino)-6-phenyl - pteridine and piperidine.

EXAMPLE 17

Using a procedure analogous to that described in Example 1, 4 - (N-ethanol-isopropanolamino - 7-(3'-hydroxy-piperidino)-2-(2'-methyl-morpholino) - 6 - phenyl-pteridine, M.P. 115–135° C., was prepared from 4-(N-ethanol-isopropanolamino)-7-chloro - 2 - (2'-methyl-morpholino)-6-phenyl-pteridine and 3-hydroxy-piperidine.

EXAMPLE 18

Using a procedure analogous to that described in Example 1, 4 - (N-ethanol-isopropanolamino)-2,7-di(3'-hydroxy - piperidino) - 6 - phenyl-pteridine, M.P. 160–165° C., was prepared from 4-(N-ethanol-isopropanol-amino)-2,7-dichloro-6-phenyl-pteridine, and at least two mol equivalents of 3-hydroxy-piperidine.

EXAMPLE 19

Using a procedure analogous to that described in Example 1, 4-diisopropanolamino - 2 - (2'-methyl-morpholino) - 7 - piperidino - 6 - phenyl-pteridine, M.P. 104–108° C., was prepared from 4-diisopropanolamino-2-(2'-methyl-morpholino) - 7 - chloro-6-phenyl-pteridine, M.P. 115–120° C., and piperidine.

EXAMPLE 20

Using a procedure analogous to that described in Example 1, 4-diisopropanolamino-2-(2'-methyl-morpholino)-7-(3'-hydroxy-piperidino)-6-phenyl - pteridine, M.P. 112–137° C., was prepared from 4-diisopropanolamino-2-(2'-methyl-morpholino)-7-chloro-6-phenyl - pteridine and 3-hydroxy-piperidine.

EXAMPLE 21

Using a procedure analogous to that described in Example 1, 4-diisopropanolamino-2-(2'-methyl-morpholino)-7-pyrrolidino-6-phenyl-pteridine, M.P. 110–122° C., was prepared from 4-diisopropanolamino-2-(2'-methyl-morpholino)-7-chloro-6-phenyl-pteridine and pyrrolidine.

EXAMPLE 22

Using a procedure analogous to that described in Example 1, 4-(2',3'-dihydroxypropyl-methylamino-2-(2'-methyl - morpholino)-7-(3' - hydroxy-piperidino)-6-phenyl-pteridine, M.P. 112–140° C., of the formula

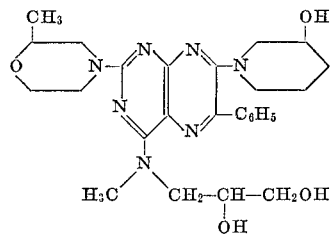

was prepared from 4-(2',3'-dihydroxypropyl-methylamino)-2-(2'-methyl-morpholino)-7-chloro - 6 - phenyl-pteridine, M.P. 110–115° C., and 3-hydroxy-piperidine.

EXAMPLE 23

Using a procedure analogous to that described in Example 1, 4-(2',3'-dihydroxypropyl-methylamino-2-(2'-methyl-morpholino)-7-pyrrolidino - 6 - phenyl-pteridine, M.P. 105–125° C., was prepared from 4-(2',3'-dihydroxy-propylmethylamino) - 2 - (2'-methyl-morpholino) - 7-chloro-6-phenyl-pteridine and pyrrolidine.

EXAMPLE 24

Using a procedure analogous to that described in Example 1, 4 - (N-ethanol-ethylamino) - 2 - (3' - hydroxy-piperidino) - 7 - morpholino - 6 - phenyl-pteridine, M.P. 188–190° C. of the formula

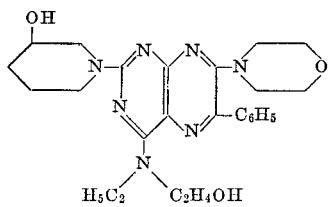

was prepared from 4 - (N - ethanol-ethylamino) - 2 - (3'-hydroxy - piperidino) - 7 - chloro - 6 - phenyl - pteridine, M.P. 181–182° C., and morpholine.

EXAMPLE 25

Using a procedure analogous to that described in Example 1, 4 - (N - ethanol - benzylamino) - 2,7 - di(3'- hydroxy - piperidino) - 6 - phenyl - pteridine, M.P. 160–162° C., of the formula

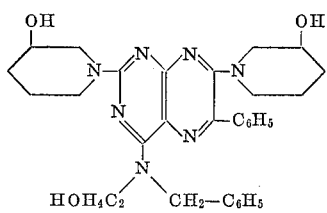

was prepared from 4-(N-ethanol-benzylamino) - 2,7 - dichloro-6-phenyl-pteridine, M.P. 151–152° C., and at least two mol equivalents of 3-hydroxy-piperidine.

EXAMPLE 26

Using a procedure analogous to that described in Example 1, 4-(N-ethanol-isopropanolamino) - 2,7 - dipyrrolidino - 6 - o - tolyl - pteridine, M.P. 207–209° C., of the formula

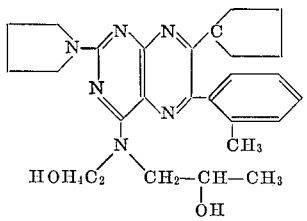

was prepared from 4-(N-ethanol - isopropanolamino)-2,7-dichloro-6-o-tolyl-pteridine, M.P. 140–142° C., and at least 2 mol equivalents of pyrrolidine.

The compounds according to the present invention, that is, those embraced by Formula I above, have useful pharmacodynamic properties. More particularly, they exhibit very strong, long-lasting coronary-dilating activities, coupled with very low toxicity in warm-blooded animals, such as dogs. Particularly active in this respect are the following:

(A) 4 - (N - ethanol - isopropanolamino) - 7 - (3'-hydroxy-piperidino)-2-pyrrolidino-6-phenyl-pteridine;

(B) 4 - (N - ethanol - isopropanolamino) - 7 - (2'-methyl-morpholino)-2-pyrrolidino-6-phenyl-pteridine;

(C) 4 - (N - ethanol - isopropanolamino) - 2 - (2'-methyl-morpholino)-7-pyrrolidino-6-phenyl-pteridine;

(D) 4 - (N - ethanol - isopropanolamino) - 2 - (2'-methyl-morpholino)-7-piperidino - 6 - phenyl-pteridine; and (E) 4 - (N - ethanol - isopropanolamino) - 7 - (3'-hydroxy-piperidino) - 2 - (2' - methyl-morpholino)-6-phenyl-pteridine.

The first two of the compounds, that is, compounds A and B, were pharmacologically tested for coronary-dilating activity in comparison with a known, very effective coronary dilator namely 2,6-bis-diethanolamino-4,8-dipiperidinopyrimido[5,4-d] pyrimidine (Compound F), in dogs under chloralose-urethane anaesthesia with open thorax. The coronary blood flow rate was measured with the aid of an electromagnetic flowmeter before, during and after in intravenous administration of 0.05 to 0.1 mgm./kg. of each compound. At the same time, the blood flow rate in the hind legs, the blood pressure and the heart beat frequency were continuously measured. Each compound was tested on from 3 to 4 dogs.

The relative coronary-dilating effectiveness of compounds A and B in relation to that of compound F was determined by planimetric evaluation of the coronary blood flow curve, taking into consideration the effective strength and duration of effective action.

In addition, the median lethal dose ($LD_{50}$) of the compounds in question was determined by standard pharmacological methods in mice.

The following table shows the results obtained from these tests.

TABLE I

| Compound: | Dose, mgm./kg. i.v. | No. of animals | Relative effective coronary-dilating activity | Duration of effective action in minutes | Blood pressure Decrease, mm. Hg | Blood pressure Duration in minutes | $LD_{50}$ mgm./kg. i.v. |
|---|---|---|---|---|---|---|---|
| F | 0.1 | 3 | 1 | 22 | 12 | 18 | 133 |
| B | 0.1 | 4 | 4.1 | 49 | 25 | 29 | 119 |
| A | 0.1 | 3 | 5.8 | 64 | 28 | 33 | 115 |

These results clearly show that the compounds according to the instant invention exhibit very strong and long-lasting coronary-dilating activities, as well as weak hypertensive activities of long duration. The peripheral blood flow was not significantly affected by compounds A and B, and their diminishing effect upon the cardiac frequency was minor at the indicated dose.

For pharmaceutical purposes the compounds of the present invention are administered to warm-blooded animals in need of coronary-dilating treatment perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, solutions, suspensions, emulsions, syrups, suppositories and the like. One effective coronary-dilating dosage unit of the compounds of the instant invention is from 0.083 to 3.4 mgm./kg. body weight, preferably from 0.165 to 1.7 mgm./kg. body weight.

The following examples illustrate a few dosage unit compositions comprising a compound according to the present invention as an active ingredient and represent the best mode contemplated of putting the invention to practical use. The parts are parts by weight unless otherwise specified.

EXAMPLE 27

Intravenous solution

The solution was compounded from the following ingredients:

|  | Parts |
|---|---|
| 4 - (N-ethanol-isopropanolamino) - 2,7 - dipyrrolidino - 6 - phenyl-pteridine | 10.0 |
| Tartaric acid | 4.0 |
| Polyethyleneglycol 600 | 100.0 |
| Distilled water, q.s.ad | [1] 2000.0 |

[1] By vol.

Compounding procedure

The polyethyleneglycol was admixed with an equal volume of distilled water, the mixture was heated to 80° C., and the tartaric acid as well as the pteridine compound were dissolved therein. The resulting solution was cooled to room temperature, diluted to the indicated volume with additional distilled water and then filtered until free from suspended particles. The filtrate was filled into 2 cc. white ampules, which were then sterilized for 20 minutes at 120° C. and sealed. One ampoule contained 10 mgm. of the pteridine compound, and when the contents thereof were administered by intravenous injection to a warm-blooded animal of about 60 kg. body weight in need of such treatment, very good coronary-dilating effects of long duration were produced.

EXAMPLE 28

Coated pills

The pill core composition was compounded from the following ingredients:

| | Parts |
|---|---|
| 4 - (N-ethanol-isopropanolamino) - 2,7 - dipyrrolidino-6-phenyl-pteridine | 30.0 |
| Lactose | 30.0 |
| Potato starch | 16.5 |
| Polyvinylpyrrolidone | 3.0 |
| Magnesium stearate | 0.5 |
| Total | 80.0 |

Compounding procedure

The pteridine compound was intimately admixed with the lactose and the potato starch, the mixture was moistened with an ethanolic 25% solution of the polyvinylpyrrolidone, the moist mass was forced through a 1.5 mm.-mesh screen, and the granulate obtained thereby was dried at 45° C. and was again passed through a 1 mm.-mesh screen. The dry granulate was then admixed with the magnesium stearate, and the mixture was pressed into 80 mgm. pill cores with the aid of a conventional tablet-making machine. The pill cores were then coated in conventional manner with a thin shell consisting essentially of sugar and talcum. One coated pill contained 30 mgm. of the pteridine compounds and, when administered perorally to a warm-blooded animal of about 60 kg. weight in need of such treatment, produced very good and long-lasting coronary-dilating effects.

EXAMPLE 29

Tablets

The tablet composition was compounded from the following ingredients:

| | Parts |
|---|---|
| 4 - (N-ethanol-isopropanolamino) - 2,7 - dipyrrolidino - 6 - phenyl-pteridine | 30.0 |
| Lactose | 30.0 |
| Potato starch | 23.0 |
| Polyvinylpyrrolidone | 6.0 |
| Magnesium stearate | 1.0 |
| Total | 120.0 |

Compounding procedure

The pteridine compound, the lactose and the potato starch were intimately admixed with each other, the mixture was moistened with an ethanolic 25% solution of the polyvinylpyrrolidone, the moist mass was forced through a 1.5 mm. mesh screen, and the moist granulate obtained thereby was dried at 45° C. and was again passed through a 1 mm.-mesh screen. The dry granulate was admixed with the magnesium stearate, and the mixture was pressed into 120 mgm. tablets with the aid of a conventional tablet-making machine. One tablet contained 60 mgm. of the pteridine compound and, when administered perorally to a warm-blooded animal of about 60 kg. body weight in need of such treatment, produced very good and long-lasting coronary-dilating effects.

EXAMPLE 30

Gelatin capsules

The capsule filler composition was compounded from the following ingredients:

| | Parts |
|---|---|
| 4 - (N-ethanol-isopropanolamino) - 2,7 - dipyrrolidino - 6 - phenyl-pteridine | 50.0 |
| Lactose | 60.0 |
| Talcum | 10.0 |
| Total | 120.0 |

Compounding procedure

The pteridine compound was intimately admixed with the lactose and the talcum, and 120 mgm.-portions of the mixture were filled into gelatin capsules of suitable size. One capsule contained 50 mgm. of the pteridine compound and, when administered perorally to a warm-blooded animal of about 60 kg. body weight in need of such treatment, produced very good and long-lasting coronary-dilating effects.

EXAMPLE 31

Drop solution

The solution was compounded from the following ingredients:

| | Parts |
|---|---|
| 4 - (N-ethanol-isopropanolamino) - 2,7 - dipyrrolidino - 6 - phenyl-pteridine | 20.0 |
| Tartaric acid | 5.0 |
| Cane sugar | 300.0 |
| Sorbic acid | 1.0 |
| Flavoring | 40.0 |
| Ethanol | [1] 200.0 |
| Polyethyleneglycol 600 | [1] 200.0 |
| Demineralized water, q.s.ad | [1] 1000.0 |

[1] By vol.

Compounding procedure

The sorbic acid was dissolved in the ethanol, an equal volume of demineralized water was added to the solution, and the pteridine compound and the tartaric acid were dissolved therein while stirring (solution A). The cane sugar was dissolved in the remaining amount of demineralized water (solution B). Solution B, the polyethyleneglycol and the flavoring were added to solution A while stirring, and the finished solution was filtered until clear. 1 cc. of the drop solution (about 5 drops) contained 20 mgm. of the pteridine compound and, when administered perorally to a warm-blooded animal of about 60 kg. body weight in need of such treatment, produced very good and long-lasting coronary-dilating effects.

EXAMPLE 32

Suppositories

The suppository composition was compounded from the following ingredients:

| | Parts |
|---|---|
| 4-(N-ethanol-isopropanolamino) - 2,7 - dipyrrolidino-6-phenyl-pteridine | 100.0 |
| Cocoa butter | 1600.0 |
| Total | 1700.0 |

Compounding procedure

The finely pulverized pteridine compound was stirred with the aid of an immersion homogenizer into the cocoa butter which had previously been melted and then cooled to 40° C. The resulting mixture was then poured at about 35° C. into cooled suppository molds, each holding 1700 mgm. of the mixture. One suppository contained 100 mgm. of the pteridine compound and, when administered by the rectal route to a warm-blooded animal of about 60 kg. body weight in need of such treatment, produced very good and long-lasting coronary-dilating effects.

Although the above dosage unit composition examples illustrate only one compound of the present invention as an active ingredient, it should be understood and will be obvious to others skilled in the art that any other compound embraced by Formula I may be substituted for the particular pteridine compound in Examples 27 through 32. Moreover, the amount of pteridine compound in these examples may be varied pursuant to the body weight of the host to achieve the unit dosage range set forth above, and the amounts and nature of the inert carrier ingredients may be varied to meet particular requirements.

I claim:
1. A compound of the formula

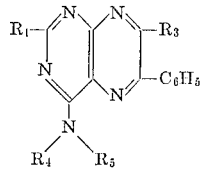

wherein $R_1$ is pyrrolidino or 2'-methyl-morpholino, $R_3$ is pyrrolidino, piperidino, 3'-hydroxy-piperidino or 2'-methyl-morpholino, $R_4$ is β-hydroxy-ethyl, β-hydroxy-n-propyl or β,γ-dihydroxy-n-propyl, and $R_5$ is β-hydroxy-n-propyl or methyl, with the proviso that $R_1$ and $R_3$ are not simultaneously 2'-methyl-morpholino.

2. A compound according to claim 1, which is 2-pyrrolidino - 4 - [N-(β-hydroxy-ethyl)-N-(β-hydroxy-n-propyl)-amino] - 6 - phenyl-7-(3'-hydroxy-piperidino)-pteridine.

3. A compound according to claim 1, which is 2-pyrrolidino - 4 - [N-(β-hydroxy-ethyl)-N-(β-hydroxy-n-propyl)-amino]-6-phenyl - 7 - (2' - methylmorpholino)-pteridine.

4. A compound according to claim 1, which is 2-(2'-methyl-morpholino) - 4 - [N-(β-hydroxy-ethyl)-N-(β-hydroxy-n-propyl)-amino] - 6 - phenyl-7-pyrrolidino-pteridine.

5. A compound according to claim 1, which is 2-(2'-methyl-morpholino) - 4 - [di-(β-hydroxy-n-propyl)-amino]-6-phenyl-7-pyrrolidino-pteridine.

6. A compound according to claim 1, which is 2,7-dipyrrolidino - 4 - [N-(β-hydroxy-ethyl)-N-(β-hydroxy-n-propyl)-amino]-6-phenyl-pteridine.

7. A compound according to claim 1, which is 2-(2'-methyl-morpholino) - 4 - [N-(β-hydroxy-ethyl)-N-(β-hydroxy-n-propyl)-amino] - 6 - phenyl-7-piperidino-pteridine.

8. A compound according to claim 1, which is 2-(2'-methyl-morpholino) - 4 - [N-(β-hydroxy-ethyl)-N-(β-hydroxy-n-propyl)-amino] - 6 - phenyl-7-(3'-hydroxy-piperidino)-pteridine.

9. A compound according to claim 1, which is 2-(2'-methyl-morpholino) - 4 - [di-(β-hydroxy-n-propyl)-amino]-6-phenyl-7-piperidino-pteridine.

10. A compound according to claim 1, which is 2-(2'-methyl-morpholino) - 4 - [di-(β-hydroxy-n-propyl)-amino]-6-phenyl-7-(3'-hydroxy-piperidino)-pteridine.

11. A compound according to claim 1, which is 2-(2' - methyl-morpholino) - 4 - [N-(β,γ-dihydroxy-n-propyl)-N-methyl-amino] - 6 - phenyl - 7 - pyrrolidino-pteridine.

References Cited

UNITED STATES PATENTS 2,940,972   6/1960   Rock _____ 260—251.5

ALEX MAZEL, Primary Examiner

A. M. T. TIGHE, Assistant Examiner

U.S. Cl. X.R.

260—251.5; 424—248, 250

PO-1050
(5/69)

UNITED STATES PATENT OFFICE
CERTIFICATE OF CORRECTION

Patent No. 3,557,105      Dated January 19, 1971

Inventor(s) Josef Roch

It is certified that error appears in the above-identified patent and that said Letters Patent are hereby corrected as shown below:

Col. 4, line 39: correct the formula to read

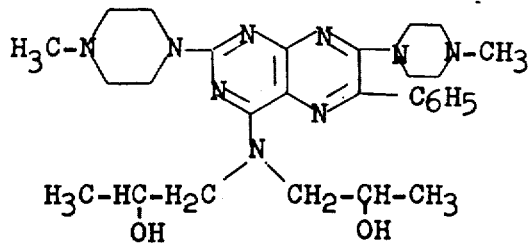

Col. 7, line 5: correct the formula to read

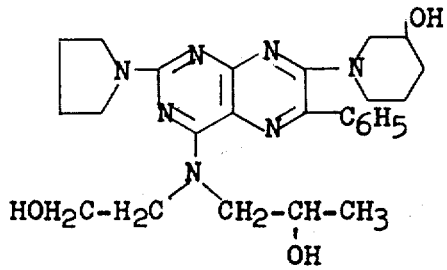

Col. 9, line 31: correct the formula to read

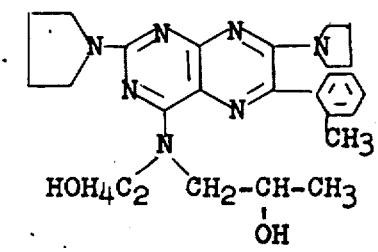

Col. 9, line 71: "in" should read --the--.

Signed and sealed this 20th day of July 1971.

(SEAL)
Attest:

EDWARD M. FLETCHER, JR.
Attesting Officer

WILLIAM E. SCHUYLER, J
Commissioner of Patent